UNITED STATES PATENT OFFICE.

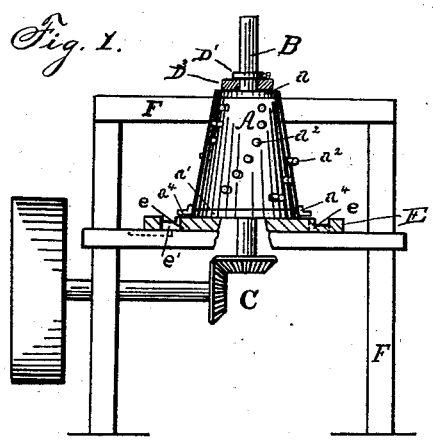

THOMAS T. KNEELAND, OF TECUMSEH, MICHIGAN.

WHEAT-HULLER.

SPECIFICATION forming part of Letters Patent No. 277,906, dated May 22, 1883.

Application filed April 4, 1882. (No model.)

*To all whom it may concern:*

Be it known that I, THOMAS T. KNEELAND, of Tecumseh, county of Lenawee, State of Michigan, have invented a new and useful Improvement in Wheat-Hullers; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claim.

In the drawings, Figure 1 is a side elevation, part in section, of an apparatus embodying my invention with the shell removed. Fig. 2 is a side elevation of the device with the shell in place upon the cone, partly in section. Fig. 3 is a plan view of the cylinder and platform with the casing removed.

It is found very desirable, in the manufacture of flour from wheat, to remove the hulls or exterior coating of the grain before grinding in order to make a flour of whiter quality than can be produced when the hulls are ground with the grain and afterward imperfectly removed by the process of bolting. Heretofore great difficulty has been experienced in accomplishing this result.

It is the object of my invention to remedy this difficulty and to provide a means of hulling wheat preparatory to grinding.

To this end A is a cylinder, preferably a section of a cone, constructed in any proper manner, preferably of staves covered with sheet-iron; with suitable caps, $a$ and $a'$, at the top and bottom.

$a^2$ represents rows of teeth, of any desired number, secured to the cone A, running perpendicularly or spirally from the top to the base. The base of the cone is provided at its sides with one or more, and preferably three, projecting ribs or wings, $a^4$. These ribs project nearly across the space between the cone and its case, but extend only a short distance upwardly on the face of the cone, and serve as clearers to carry the grain forward and sweep the same over the openings, through which it falls into a suitable hopper beneath.

These clearers or wings, on account of their limited upward extent, do not interfere at all with the action of the teeth upon the wheat.

B is a shaft rigidly secured in the caps $a$ and $a'$, and passes through the center of the cone, connecting at its lower end with a suitable gearing for driving it, as shown at C.

D is the shell or covering of the cone, preferably made of staves banded together and lined on the inside with sheet-iron. This shell is made larger than the cone, to leave a suitable passage for the grain.

$d$ represents teeth secured to the shell, projecting from the interior and adapted to mesh with the teeth upon the cone.

$d'$ is the cover or cap, secured upon the top of the shell and cone.

D' is a suitable collar upon the shaft B, resting upon a cross-bar, $D^3$, for supporting the shaft. $D^2$ is a hopper for conveying grain into the huller.

E is a platform, upon which the cone A is secured.

$e$ is a furrow in the platform, fitted to receive the lower rim of the shell D.

F is any suitable frame to support the platform and huller:

$d^2$ represents rods secured to the platform and adapted to secure the cap $d'$ in position.

$e'$ represents one or more delivery-holes.

$e^2$ are slides for regulating the discharge of the grain by closing more or less the delivery-holes. These delivery-holes are located immediately beneath the shell or case and just outside of the space between the cone and the shell or case, so that the grain, as it is swept forward by the clearers $a^4$, is not left to resist the outflow of the grain that follows, but drops at once through the openings into the hopper beneath.

The operation of this device is as follows: Dampened grain is caused to enter the hopper $D^2$, which passes from thence into the chamber between the cone A and the shell D, where it is rubbed between the teeth and conveyed to the bottom, where the ribs $a^4$ force the grain to the delivery-holes, where it is discharged.

Heretofore, in similar machines, it has been found difficult or impossible to prevent the damp grain from clogging; but the revolving ribs $a^4$ are found effectually to overcome this difficulty when they are employed in connection with the discharge-holes $e'$.

What I claim is—

The combination, with the toothed casing, toothed cylinder, having wings $a^4$, and the platform E, having delivery-openings $e'$, of the slides $e^2$, substantially as and for the purpose set forth.

In testimony whereof I sign this specification in the presence of two witnesses.

THOMAS T. KNEELAND.

Witnesses:
J. EDW. WARREN,
SAMUEL E. THOMAS.